Aug. 3, 1971            F. J. BROOKS            3,597,308

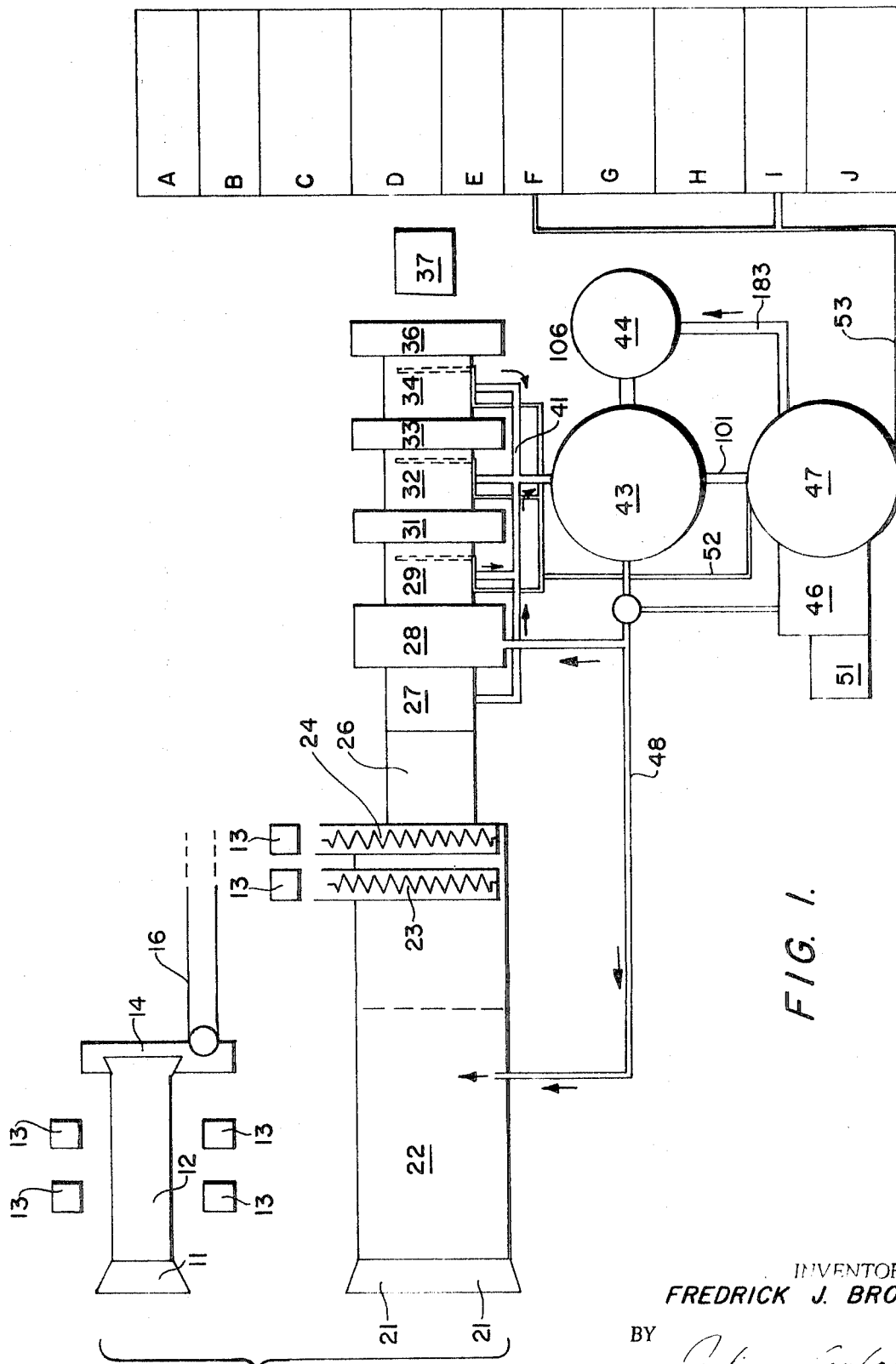

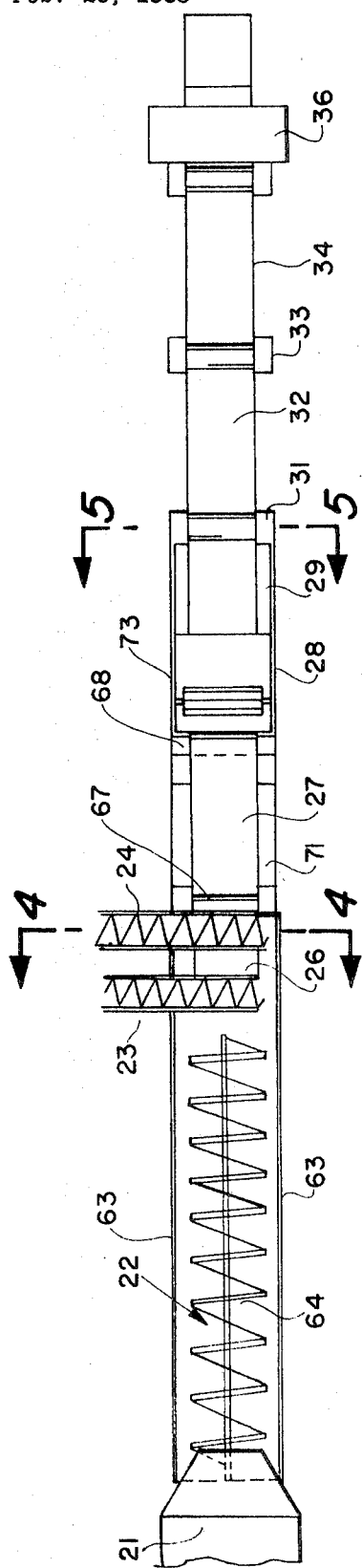
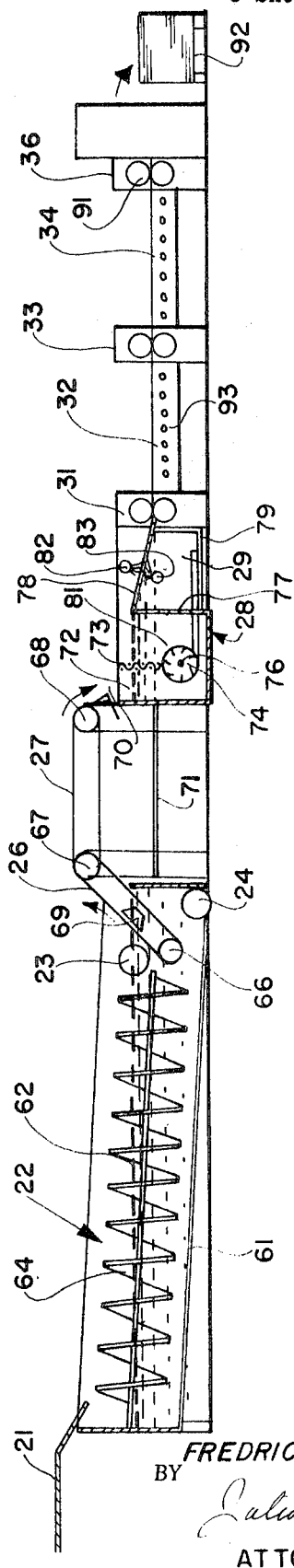

METHOD FOR DISPOSAL OF REFUSE AND RECOVERY OF BY-PRODUCTS

Filed Feb. 23, 1968            5 Sheets-Sheet 3

INVENTOR.
FREDRICK J. BROOKS

BY Julian Coplan

ATTORNEY

United States Patent Office 3,597,308
Patented Aug. 3, 1971

3,597,308
METHOD FOR DISPOSAL OF REFUSE AND RECOVERY OF BY-PRODUCTS
Frederick J. Brooks, San Rafael, Calif., assignor to Astrotronic Research, Ltd., North Vancouver, British Columbia, Canada
Filed Feb. 23, 1968, Ser. No. 707,810
Int. Cl. D21b 1/08, 1/32; D21c 5/02
U.S. Cl. 162—4
8 Claims

ABSTRACT OF THE DISCLOSURE

Refuse is immersed and agitated in water in a tank to segregate components by specific gravity. Light and heavy components are separately removed from the tank and separately processed. Medium weight components are primarily paper and fiber pulp stock. Such stock is purified, then processed into pulp board in a mill. Water drained from the mill is filtered and recycled. Combustible refuse is used as fuel to burn contaminated refuse and to produce steam from some of the water. The steam is used to clean certain components, to purify pulp stock, and to form "potable" water by condensation. Sludge settling from the tank, the filter and the burner is used for fertilizer. Many other useful by-products are recovered.

---

This invention relates to a new and improved apparatus and method for disposal of refuse.

A principal object of the present invention is to provide apparatus and method for the disposal of refuse which eliminate the objectionable odors, fumes, water pollution and other disadvantages of conventional means of disposal and yet produce as by-products useful industrial and agricultural materials.

A principal feature of the present invention is the fact that promptly after reaching the disposal plant the refuse is immersed in water, thereby avoiding the objectionable odors which arise from conventional earth-fill disposal systems.

Another feature of the invention is the fact that the water used in the system is to a considerable extent recovered, filtered and recycled. No contaminated water is discharged from the system into streams nor into ponds. Although makeup water is required for operation of the system, such makeup water need not be of a high degree of purity. In fact, salt water, sewage, or sewage processing plant effluent may be used in the system.

The aforegoing advantages of the invention allow the plant to be located in or near populated areas which are the source of the refuse. Accordingly, the distance which the refuse must be hauled to the plant is reduced with consequent reduction in cost. In addition, the plant may be permanently located as contrasted with land-fill operations where the location changes and where new locations cause objections by residents and businesses located nearby.

A principal feature of the invention is the fact that the refuse is agitated in a water tank, causing the ingredients of refuse to separate with regard to their specific gravity, facilitating separating the ingredients into their various components so that each of the components may be sorted and processed to an economically useful condition.

Contaminated components are burned in a burner which is fueled by burnable components of the refuse. Discharge of the burner is scrubbed so that smog-producing and odor-producing fumes are not released to the atmosphere. The burner is used to generate steam, which is used in the system or condensed to useable water.

Principal components of refuse are paper and fiber. Such components are separated from the lighter and heavier components by water flotation, cleaned of objectionable entrapped ingredients, worked into a pulp and fabricated into dried pulp board which may be used as paper stock, or as a construction material.

Heavier ingredients of the refuse are allowed to settle as sediment and are then separated into their various types and separately handled. Examples are glass, plastic, metal and rags. The glass may be ground into an economically useful material. The plastic may be formed into pellets for reprocessing, and the metal and rags may be cleaned for salvage purposes.

The light components of the refuse are skimmed from the top of the tank and likewise used. Thus wood and agricultural elements of refuse may be comminuted into a fuel for the burner and steam generator.

Some of the sediment of the refuse consists of earth and organic material. Such components are recovered and used for soil enrichment.

A feature and advantage of the invention is the low fuel requirements of the system, which is occasioned in part by reason of the fact that wood and similar burnable component are recovered and used. Since such components are a substantial part of refuse, the amount of purchased fuel is greatly reduced.

Another advantage of the apparatus hereinafter described is the fact that the various parts thereof are to a considerable extent commercially available since they are used in other industries. Hence the cost of fabricating the apparatus is substantially reduced.

Still another feature of the invention is the fact that the initial cost and maintenance cost, as well as the labor cost of operation are such that an economically feasible operation may be conducted. The by-products of the system result in a surplus in the cash flow of the operation.

Other objects of the present invention will become apparent upon reading the following specification and referring to the accompanying drawings in which similar characters of reference represent corresponding parts in each of the several views.

In the drawings:

FIG. 1 is a schematic plan view of the operation in the form of a flow sheet.

FIG. 2 is a top plan view showing the water tanks and pulp board mill portions of the system.

FIG. 3 is a longitudinal vertical sectional view through the structure of FIG. 2.

Figure 4:
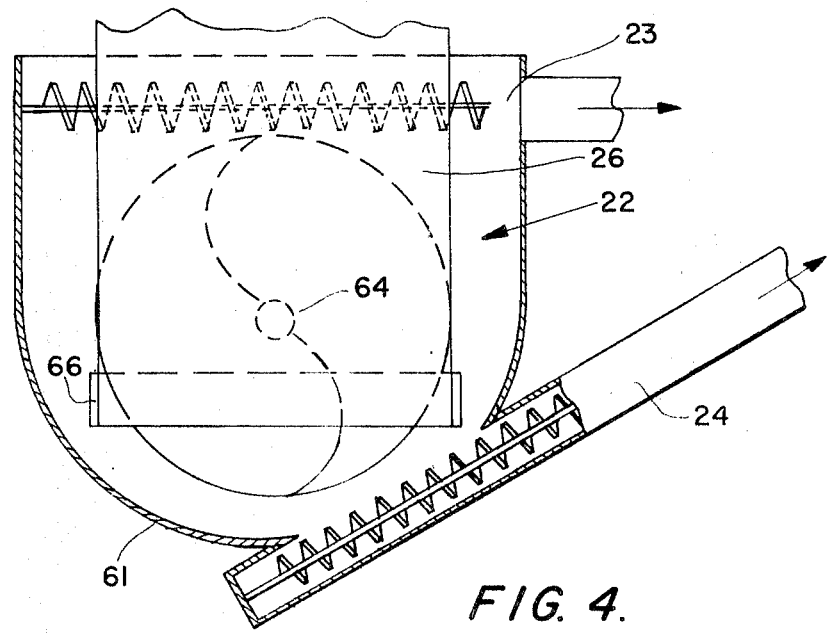
Figure 5:
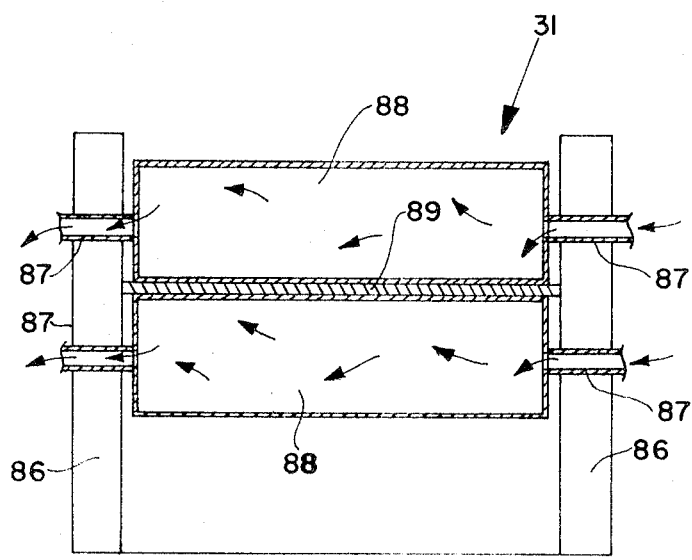

FIGS. 4 and 5 are respectively transverse sectional views, taken substantially along the lines 4—4 and 5—5 of FIG 2.

Figure 6:
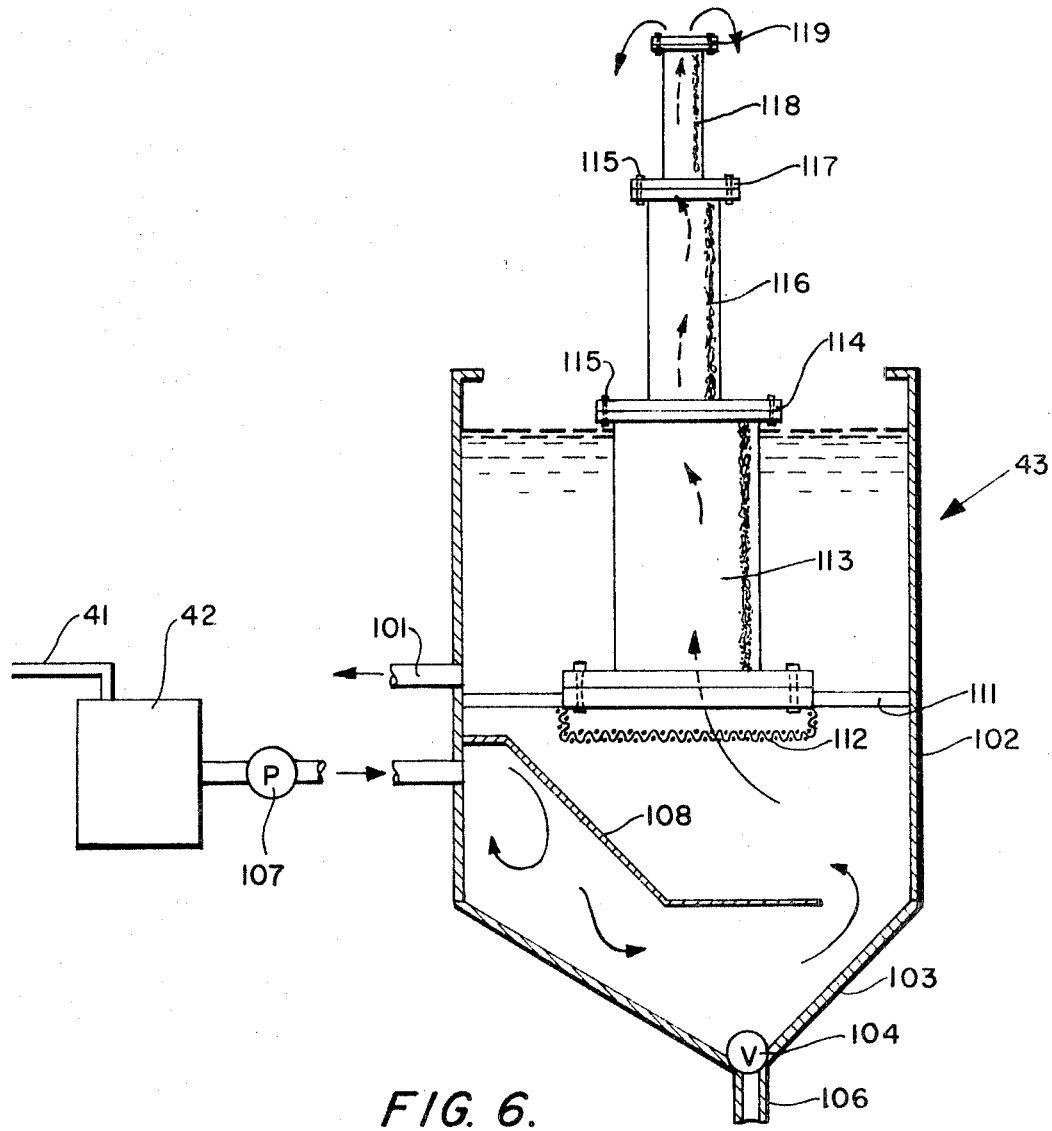

FIG. 6 is a vertical sectional view through the filter.

Figure 7:
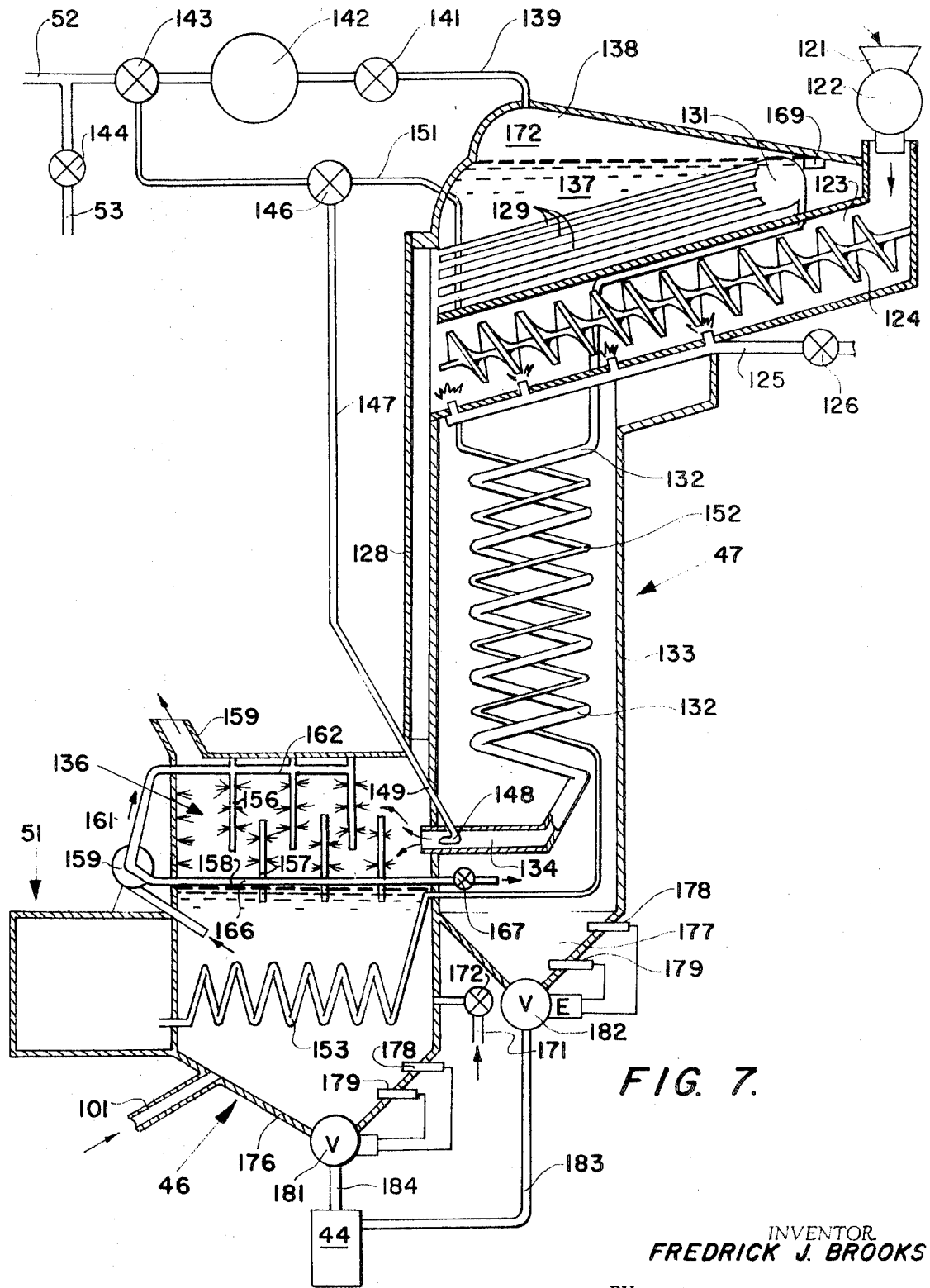

FIG. 7 is a vertical sectional view through the burner and associated mechanism.

Attention is first directed to FIG. 1, which is a schematic flow sheet of the apparatus and method. Refuse received in trucks is of two general types, "dry" and "wet." Dry refuse, which contains much industrial and commercial refuse as distinguished from household garbage is discharged from trucks onto a ramp 11 and slides down onto a slopping table 12 where workmen salvage various identifiable components, placing them in carts 13, according to type. Non-salvageable components travel to an end table 14 and are then conveyed by conveyors 16 to land-fill, or transported to another location. The carts 13 are dumped into a succession of bins A–J inclusive, which also receive salvageable ingredients from the wet refuse as hereinafter described.

The wet refuse is deposited from the trucks on ramps 21 and slides into a first tank 22, which is filled with water and subjected to agitation. Since the refuse is rapidly immersed in the water, the discharge of objectionable odors is quickly terminated. Agitation of the refuse separates the ingredients in accordance with their specific gravity. A helical conveyor 23 skims off the floating ingredients from the top of the tank. A second conveyor 24, which is located at the bottom of the tank 22, discharges the heavy components, such as metal, dirt, and the like. The metal components are separated by magnetic separators or other means, while the dirt together with organic components is used for agricultural or household gardening purposes.

Much of the composition of wet refuse consists of paper and fiber, which is of intermediate specific gravity. Such components travel to the end of tank 22 and are elevated by means of draper 26 to an inspection table 27, where workmen remove and discard objectionable items which would reduce the value of the pulp board, which is ultimately produced. Such objectionable items may be removed by vacuum hoses or tongs (not shown), or other means. From the inspection table 27, the ingredients are immersed into a second tank 28 and thence into a purifying tank 29 where chemicals and steam are added to destroy harmful bacteria, and the like. The pulp stock then passes through a first press 31, a first drying table 32, a second press 33, a second drying table 34, a cutter 36 and bale handling equipment 37.

The bales at the bale handling station 37 are of dry pulp board which may be used for processing into paper, or may be used as a construction material.

At stations 27 and 29–34 inclusive, water drains or is squeezed from the pulp and such water flows through conduit 41 to a holding tank 42 (not shown in FIG. 1 but shown in FIG. 6) and thence to a water filter 43. Filter 43 also produces a quantity of sludge useful as fertilizer which is received in tank 44. Some of the water filtered in filter 43 is directed to storage tank 46 associated with burner 47, and other water is directed by means of conduit 48 into tanks 22 or 28.

Burner 47 is fired by sawdust or, if necessary, by gas and generates steam. Part of the steam is condensed to "potable" water in tank 51. Other steam is directed by pipe 52 into purifier 29. Still other steam is directed by conduit 53 to various bins A–J inclusive for steam purification of ingredients. Thus in bin F, plastic may be accumulated, ground to pellet size and steam-cleaned for eventual reuse in plastic-forming operations. In bin I, rags may be accumulated and these may be steam-cleaned so that they are of industrial value. It will be understood that these are merely representative examples of how the various salvage materials in bins A–J inclusive may be cleaned.

Although the types of ingredients which are salvaged and stored in bins A–J inclusive depends upon economic conditions and the availability thereof in the source of refuse, representative examples are newspapers in bin A, kraft paper in bin B, pulp board produced from baler 37 in bin C, wood and sawdust in bin D (which may be ground and used in burner 47), glass in bin E, plastics in bin F, various metals in bin G, general salvagable materials in bin H, rags in bin I, and various metal containers in bin J. The value of the salvagable materials thus described, together with sludge and fertilizer, makes the operation economically feasible.

Directing attention now to FIGS. 2 and 3, which comprise the pulp board making portion of the operation, the bottom 61 of tank 22 slopes downwardly-forwardly. The water level 62 is maintained about half way up the sides 63 of the tank so that the ingredients are immersed in the water. Slowly revolving inside the tank 22 is a screw conveyor 64 which continuously agitates the refuse as it proceeds from the left to right in FIGS. 2 and 3. Very light components rise to the surface and are skimmed off and conveyed away by conveyor 23, above water level 62. Typical examples of such light materials are wood, closed empty containers, and the like. Very heavy components settle to the bottom of the tank and are conveyed away by conveyor 24. Typical examples of such materials are dirt, heavy organic substances present in garbage, metal, and the like.

Near the forward end of tank 22 is a transverse horizontal roller 66, around which passes a continuous draper 26 which is porous. Draper 26 also passes over rear inspection station roller 67 and forward inspection station roller 68, and thus the draper 26 passes in a continuous path up from adjacent the bottom of tank 22 to the horizontal inspection station 27 and return. At and immediately above water level, a vacuum head 69 is located which sucks the water from the pulp from the underside of draper 26 and causes it to adhere to the draper in a manner well understood in the pulp board making art. At inspection station 27, attendants separate out ingredients which are exposed on the belt which would be detrimental to the economic value of the pulp board eventually produced. Thus fruit skins, plastics and various other undesirable elements are removed. Removal may be accomplished by vacuum hoses, by tongs, or other means. A certain amount of water drips from the pulp at station 27, falling into pan 71 and this water is eventually conveyed to filter 43, as has heretofore been explained.

Material discharged over the roller 68 of inspection station 27 flows into second tank 28, which is also maintained with water at a level 72. Scraper blade 70 scrapes from draper 26 what would otherwise adhere thereto. Located adjacent the bottom of tank 28 is a pump 74 which is provided with agitating paddles 76, causing the pulp in tank 28 to be continuously agitated. A substantially vertical transverse porous screen 73 is located in tank 28 to insure first downward and then upward circulation of pulp. A vertical wall 77 is located to the right of pump 76. Wall 77 defines purification section 29. Section 29 has a downward forwardly-sloping screen 78. Pulp floats over the top of wall 77 and onto screen 78. Water dropping through screen 78 is picked up by the intake 79 of pump 74. Movement of the pulp along screen 78 is augmented by steam jets 82 and 83 located above and below the screen 78. Such jets assist in purifying the pulp as well as helping in conveying the same. Purification is augmented by chemicals added to section 29. The pulp passes into the first press 31. Such a press comprises side stands 86 which support the ends 87 of rollers 88. The ends 87 are hollow and steam may be circulated through the hollow rollers 88 to heat the same. The pulp board 89 between the rollers 88 is compressed and water driven off. The spacing between the rollers 88 may be adjusted if desired, as is well understood in the pulp-making art. The pulp 89 travels along a table 32 and thence into second press 33 which is similar to press 31, thence along a second drying table 34 and into a cutter 36 which has feed rollers 91 and rotary shears (not shown). Tables 32, 34 are heated by steam pipes 93 imbedded therein to drive off water. Boards are deposited on a pallet 92 for handling and transportation. Beneath stations 31–36 inclusive is a pan 93 which collects the water squeezed from the board and such water is conveyed to the filter 43 through conduits 41.

Directing attention now to FIG. 6, a preferred form of hydrostatic filter is illustrated. A cylindrical tank 102 is provided with a conical bottom 103, into which sludge settles and which may be periodically discharged through valve 104 and conduit 106, to sludge tank 44. Water received in storage tank 42 from conduits 41 is pumped by pump 107 into a position adjacent the bottom of tank 102 and directed by baffle 108 in a circuitous path which assists in settling out the sludge into bottom 103. Supported on a frame 111 in tank 102 is a column having a bottom filter 112, a lower filter cylinder 113 filled with a porous filter element, a second filter screen 114, a further cylindrical filter column 116, a still further filter 117, and an upper cylindrical filter column 118, on the top of which is still another filter screen 119. The various filter columns are flanged and connected together by bolts 115. It will be understood that the number of filters and their construction is a matter of choice, depending upon the degree of contamination of the water which occurs in the particular system. Pump 107 forces water up through the successive filter screens 112, 114, 117, 119 and through the porous filter columns 113, 116, 118, thereby removing solid contaminants. The filters are changed periodically as required, or replaced. Water discharged from filter 119 cascades down into the tank 102, being exposed to air and thereby further purified. Discharge conduit 101 communicates with burner 47, or back to tanks 22 and 28.

A preferred burner is shown in FIG. 7. Fuel for the burner may be sawdust or the like, deposited in hopper 121. Refuse (such as hospital waste, dead animals, and the like) which is so contaminated that it cannot be salvaged may also be deposited in hopper 121. Motor 122 forces such material into the intake of burner 123, which has a screw conveyor 124 which drives the material to the left, as shown in FIG. 7. The material is burned in burner 123. To start the burner and to sustain the temperature when the fuel supply is otherwise inadequate, gas admitted through pipe 125 and controlled by valve 126 jets through jets 127 into the bottom of burner 123. The burned ash is discharged from burner 123 into a vertical flue 128 and drops to the bottom. Fumes rise in flue 128 and pass through tubes 129 and are forced by exhaust fan 131 through coil 132 in the underlying column 133 of the burner until they are discharged through discharge pipe 134 into the scrubber section 136, hereinafter described in detail. The heat of burner 123 and the heat in the gases passing through tubes 129 heats water which rises from the bottom of column 133 to the top of chamber 137 to form steam in dome 138. Steam is discharged from dome 138 into pipe 139, controlled by valve 141 into a further electric generator 142 which generates power for operation of equipment. The steam discharged from generator 142 is used for various purposes. Thus some of the steam, as controlled by valve 143, is directed into pipe 52 which leads to the purifier section 29 of the second washtank 28. Other steam discharged through pipe 53 controlled by valve 144 is used to clean and sterilize by-products in bins F and I, for example. Additional steam as controlled by valve 146 passes through pipe 147 and is used to operate a steam jet 148 in the bottom of pipe 134 to force the flue gases into and through the scrubber 136. Additional steam jets 149 in scrubber 136 facilitate scrubbing action. Still additional steam may, if desired, pass through pipe 151 and down through helical coil 152 in column 133 and thence into coils 153 in storage tank 146, discharging into potable water reservoir 51. The steam in passing through coil 153 is condensed.

To prevent discharge of undesirable fumes into the atmosphere, the scrubber section 136 is provided. A series of baffles 156, 157 is installed in the scrubber section above the water level 158. Pump 159 draws water from storage tank 46 through pipes 161 and jets 162. The combined effect of steam jets 149 and water jets 162 is to scrub solid materials out of the flue gas so that it can be discharged through stack 159 to the atmosphere without fear of contamination of the atmosphere.

Pump 159 also forces water drawn from storage tank 46 through pipe 166 onto the bottom of column 133, under the control of valve 167. Valve 167 is controlled by a float valve 169 at the top of the column. Makeup water enters through pipe 171 under the control of valve 172 into the storage tank 46.

The water system therefore is as follows: Makeup water entering through pipe 171 and return water traveling through pipe 101 enters storage tank 46. Pump 159 draws water from storage tank 46, using part of the same for scrubbing purposes but driving the bulk of the water through pipe 166 to the bottom of column 133 and thence up the column where it is heated by the flue gases in coils 132 and the steam in coils 152. At the top of column 133 the water encounters the burner section 123 and hot flue gases in tubes 129, heating the water and forming steam in dome 138. The water in the burner 47 is maintained at level 172 by control 169 which governs valve 167. The level of water in tank 46 operates an automatic control (not shown) governing valve 172 controlling admission of makeup water through pipe 171. Makeup water may be of any type, either pure or contaminated.

Sludge settling out of the water in the system heretofore described is deposited either in the conical bottom 176 of storage tank 46, or the conical bottom 177 of column 133. In either case there are controls 178, 179 which govern valves 181, 182 in sections 176, 177, respectively, so that as the sludge accumulates it may be discharged through pipes 183, 184 to sludge storage tank 44.

The operation of the system is partially described in the description of the function of the various pieces of apparatus which has heretofore been set forth. It should be noted, however, that there are certain unique and desirable features which have important advantages over refuse disposal systems heretofore designed. One of the most important is the fact that in the tank 22 the components of the refuse are separated by gravity and the lighter and heavier components removed so that what is essentially pulp stock remains. The pulp stock is purified and formed into boards in the sections designated in FIG. 1, as 31–36 inclusive. Components discharged from tank 22 through conveyors 23 and 24 are sorted into their various types and used as raw materials for industrial purposes.

No water is discharged from the system except such water as may be deemed potable in tank 51. The water which drains from the pulp-making operation is filtered in filter 43 and recycled or heated in burner 47 to form steam which may be used in other stages of the operation. The burner 47 disposes of wood and other burnable materials and also incinerates nonsalvageable components, such as hospital waste, dead animals, and the like.

Fumes and ash from the burning operation are scrubbed so that the stack discharge is not a nuisance. Solid components from the burner and water storage are used as fertilizer or soil enrichment material. Thus substantially all refuse ingredients are processed to economic utility, more than defraying the cost of the apparatus, its operation and maintenance.

What is claimed is:

1. A method of handling refuse having components of varying specific gravity and containing large volumes of paper and fiber of medium specific gravity, lighter components of lower specific gravity including wood and agricultural elements, heavier components of higher specific gravity including glass, plastic, metal and rags, said method comprising immersing said refuse in a long tank of water, continuously agitating said components of refuse to disperse said components in said water in accordance with the specific gravity of the components while conveying said components toward one end of said tank, removing the paper and fiber components of medium specific gravity in the form of pulp from the water by conveying said pulp from the water at about midway of the height of said tank adjacent said one end, conveying away said lighter components off the top of said water near said one end, comminuting and burning said lighter components, separately conveying away the heavier components from said water by discharging the heavier components from said tank near the bottom and adjacent said one end of said tank, and separately salvaging each of said heavier components.

2. A method according to claim 1, which further comprises forming pulp board from said pulp.

3. A method according to claim 1, which further comprises removing impurities from said pulp, and squeezing water from said pulp.

4. A method according to claim 3, which further comprises filtering said water and recirculating said water for said immersing step.

5. A method according to claim 4 in which said filtered water is heated by the heat from the step of burning of said lighter components and which further comprises scrubbing the combustion gases of said combustible components, said heated water being used in scrubbing said gases.

6. A method according to claim 5, which further comprises heating said water to form steam and then condensing the steam to potable water by circulating said steam in coils through the water used to scrub said combustion gases.

7. A method according to claim 6, which further comprises forming steam from some of said water, scrubbing said gases with a part of said steam and purifying said pulp with some of said steam.

8. A method according to claim 7, which further comprises salvaging some of the lighter and heavier components of said refuse and cleaning some of said components with some of said steam.

References Cited
UNITED STATES PATENTS

| | | | |
|---|---|---|---|
| 1,593,491 | 7/1926 | Gerson | 162—55X |
| 2,331,455 | 10/1943 | Cowles | 162—4X |
| 3,367,495 | 2/1968 | Lea et al. | 209—173X |

HOWARD R. CAINE, Primary Examiner

U.S. Cl. X.R.

162—55, 91; 209—10, 162, 173